UNITED STATES PATENT OFFICE.

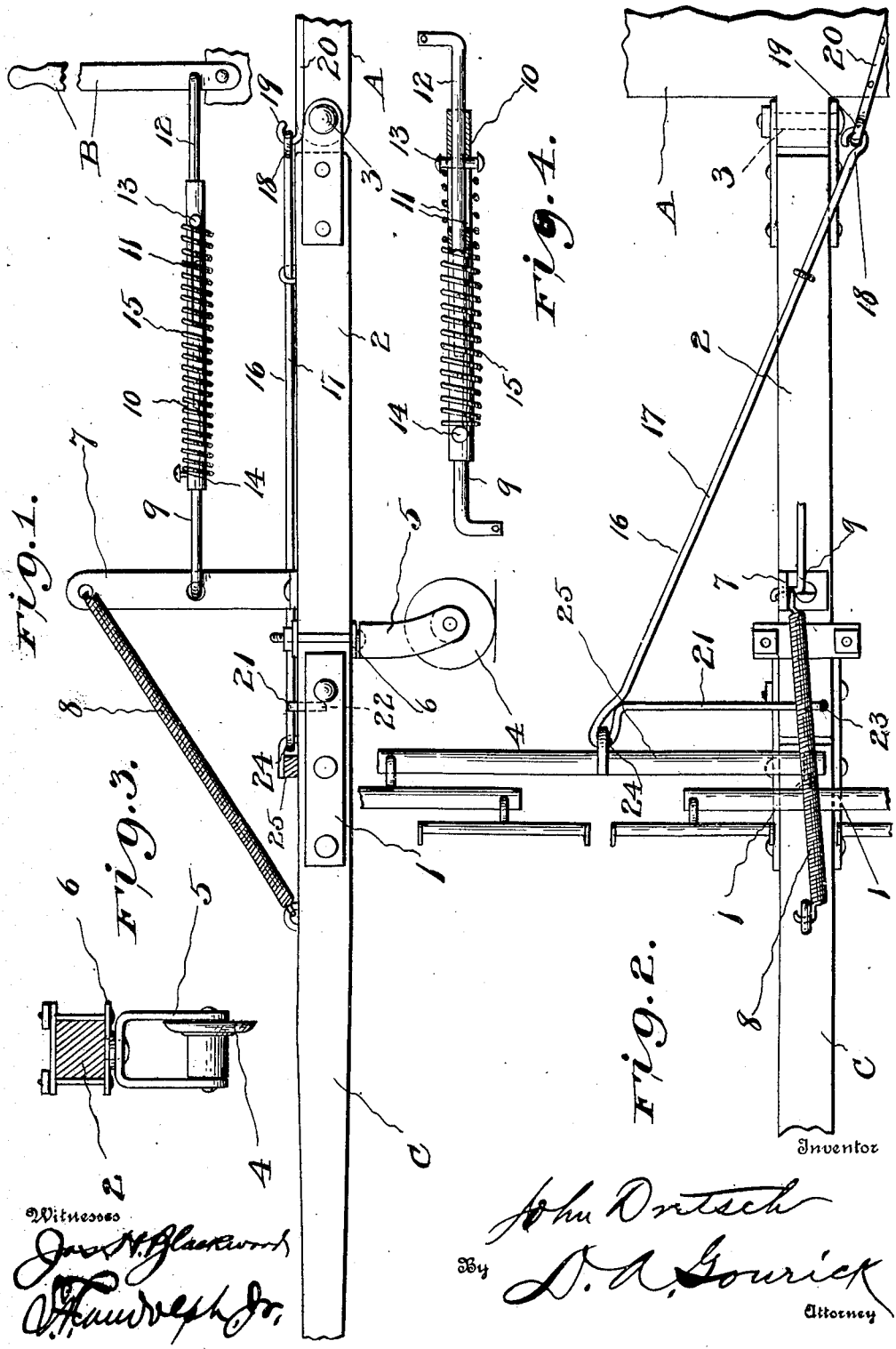

JOHN DRETSCH, OF CLARK COUNTY, SOUTH DAKOTA.

TRUCK FOR HARVESTING-MACHINES.

No. 920,117.　　　　　Specification of Letters Patent.　　　　　Patented May 4, 1909.

Application filed February 8, 1909. Serial No. 476,662.

*To all whom it may concern:*

Be it known that I, JOHN DRETSCH, a citizen of the United States, residing in Clark county, State of South Dakota, have invented certain new and useful Improvements in Trucks for Harvesting-Machines, of which the following is a specification.

My invention relates to trucks for supporting the front of the platform of a harvesting machine and the rear end of the draft tongue and has for its object the provision of a truck pivotally secured to the draft tongue and having an upright post secured thereto with a spring connecting said post and the tongue and a spring lengthened rod connecting the post and the tilting lever of the machine so as to counteract the jar incident to the truck striking stones, clods and other unevennesses in the field.

My improved truck will be described in detail hereinafter and illustrated in the accompanying drawings in which—

Figure 1 is a side view of a fragment of a harvesting machine showing my improved truck secured thereto, Fig. 2, a plan view of the machine fragment and truck, Fig. 3, a cross section of the truck, and Fig. 4, a longitudinal sectional view of the spring rod connecting the truck and tilting lever on the machine.

In the drawings similar reference characters indicate corresponding parts in all of the views.

A indicates the platform of a harvesting machine and B the tilting lever suitably fulcrumed thereon. C indicates the draft pole or tongue.

Draft pole C has rods 1 secured thereto, and extending rearwardly therefrom, between which are pivotally secured the front end of platform 2 of the truck, the rear end of the truck being pivotally secured to the front end of platform A as shown at 3.

4 indicates the truck wheel journaled in an inverted U-shaped support 5 swivelly mounted on plate 6 secured to the underside of platform 2.

7 indicates a post secured to platform 2, 8 a spring connecting the upper end of post 7 and the rear end of tongue C while 9 indicates a rod connecting the post 7 and tilting lever B.

Rod 9 consists of two parts, one part having a tubular portion 10 secured thereto and provided with oppositely disposed longitudinal slots 11 while the other part consists of a bar 12 slidably mounted in tubular portion 10 and having a pin 13 secured through it and the slots 11. 14 indicates a pin secured through tubular portion 10 and 15 a spring mounted on tubular portion 10 and engaging the pins 13 and 14. By this construction of rod 9 it will be understood that the spring 15 holds the rod in its fully extended position, normally, but should the wheel 4 encounter a stone or other obstruction so that the front of the truck is thrown upwardly the spring 15 will take up the jar incident thereto allowing the rod 9 to momentarily shorten so that the lever B and the machine does not feel the jar. Spring 8 also assists spring 15 on rod 9 in disposing of the jars of the truck.

The draft appliances consist of an angular frame 16 having one side 17 formed with a hook 18 at its rear end that engages eye-loop 19 on the end of bar 20 secured to platform A and the other side 21 having its free end formed with angular portion 22 that engages a hole 23 in the front of platform 2. 24 indicates a loop formed at the juncture of sides 17 and 21 of frame 16 to which is secured the draft evener 25. By this construction of draft appliance the evener 25 is brought as near to the platform A as it would be if the draft pole C had been secured to the platform, so that the power necessary to pull the machine is less than in machines employing other forms of trucks in which the evener is secured to the draft pole in advance of the truck. This construction aided by the truck wheel 4 which is flanged as shown so that it cuts into the soil practically eliminates side draft.

Having thus described my invention what I claim is—

1. In combination with a harvesting machine platform, a tilting lever fulcrumed thereon, and a draft pole, a truck interposed between said draft pole and platform, a post secured to the truck, a spring connecting the post and draft pole, and a spring extended rod connecting the post and tilting lever.

2. In combination with a harvesting machine platform, a tilting lever fulcrumed thereon, and a draft pole, a truck interposed between said draft pole and platform and pivotally secured thereto, a post secured to the truck, a spring connecting the post and draft pole, a spring extended rod connecting the post and tilting lever, and a wheel swivelly mounted on said truck.

3. In combination with a harvesting machine platform, a bar secured to said platform having an eyeloop in its front end, and a draft pole, a truck interposed between the draft pole and platform, a draft appliance consisting of an angular frame, one side of the frame having a hook to engage the eyeloop aforesaid, the other side of the frame engaging the front end of the truck, a loop at the juncture of the two sides, and a draft evener secured to the loop.

4. In combination with a harvesting machine platform, a tilting lever fulcrumed thereon, a bar secured to said platform having an eyeloop in its front end, and a draft pole, a truck interposed between the draft pole and platform and pivotally secured thereto, a post secured to the truck, a spring connecting the post and draft pole, a spring extended rod connecting the post and tilting lever, and a draft appliance consisting of an angular frame, one side of the frame having a hook to engage the eyeloop aforesaid, the other side of the frame engaging the front end of the truck, a loop at the juncture of the two sides, and a draft evener secured to the loop.

In testimony whereof I hereto affix my signature in the presence of two witnesses.

JOHN DRETSCH.

Witnesses:
BARNES THOMPSON,
JOHN J. HURLEY.